United States Patent
Witkowski et al.

(10) Patent No.: US 10,957,138 B2
(45) Date of Patent: Mar. 23, 2021

(54) COMMUNICATION SYSTEM AND METHOD FOR A BARRIER OPERATOR

(71) Applicant: Gentex Corporation, Zeeland, MI (US)

(72) Inventors: Todd R. Witkowski, Zeeland, MI (US); Thomas D. Klaver, Ada, MI (US); Kevin J. Key, Holland, MI (US); Steven L. Willard, II, Holland, MI (US); Kelly S. Harrelson, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 15 days.

(21) Appl. No.: 16/058,206

(22) Filed: Aug. 8, 2018

(65) Prior Publication Data

US 2019/0051067 A1 Feb. 14, 2019

Related U.S. Application Data

(60) Provisional application No. 62/543,154, filed on Aug. 9, 2017.

(51) Int. Cl.
*G07C 9/29* (2020.01)
*E05F 15/79* (2015.01)
(Continued)

(52) U.S. Cl.
CPC .............. *G07C 9/29* (2020.01); *E05F 15/60* (2015.01); *E05F 15/603* (2015.01);
(Continued)

(58) Field of Classification Search
CPC ....... E05F 15/60; E05F 15/603; E05F 15/681; E05F 15/79; E05Y 2400/30;
(Continued)

(56) References Cited

U.S. PATENT DOCUMENTS 7,269,416 B2 9/2007 Guthrie et al.
2003/0000777 A1* 1/2003 Lence Barreiro ....... B66B 13/22
187/391
(Continued)

FOREIGN PATENT DOCUMENTS

RU 2331100 C2 8/2008

OTHER PUBLICATIONS

International Search Report dated Nov. 22, 2018, received in corresponding U.S. Appl. No. 16/058,206, 3 pages.
(Continued)

*Primary Examiner* — Omer S Khan
(74) *Attorney, Agent, or Firm* — Price Heneveld LLP; Bradley D. Johnson (57) ABSTRACT

A system and method for communicating with a barrier operator system to direct operation of a barrier. The system and method may include adaptively updating an expected time duration for an operational sequence that includes occurrence of an event relating to operation of the barrier operator system and receipt of a status message from the barrier operator system. The system may monitor and record the elapsed time for the operational sequence, and determine the expected time duration for the operational sequence based on the recorded history of elapsed times. If the status message is not received within the expected time duration after occurrence of the event, the system may transmit a status request message to the barrier operator system to obtain information relating to the status of the barrier operator system or the barrier, or both.

4 Claims, 7 Drawing Sheets

(51) Int. Cl.
  *E05F 15/681* (2015.01)
  *E05F 15/603* (2015.01)
  *H04L 29/08* (2006.01)
  *G07C 9/00* (2020.01)
  *E05F 15/60* (2015.01)
  *H04W 4/40* (2018.01)
  *H04W 4/44* (2018.01)

(52) U.S. Cl.
  CPC ............ *E05F 15/681* (2015.01); *E05F 15/79* (2015.01); *G07C 9/00309* (2013.01); *H04L 67/125* (2013.01); *H04W 4/40* (2018.02); *E05Y 2400/30* (2013.01); *E05Y 2400/82* (2013.01); *E05Y 2900/106* (2013.01); *E05Y 2900/40* (2013.01); *G07C 2009/00793* (2013.01); *G07C 2009/00928* (2013.01); *G07C 2209/08* (2013.01); *H04L 67/12* (2013.01); *H04W 4/44* (2018.02)

(58) Field of Classification Search
  CPC .......... E05Y 2400/82; E05Y 2900/106; E05Y 2900/40; G07C 2009/00793; G07C 2009/00928; G07C 2209/08; G07C 9/00119; G07C 9/00309; H04L 67/12; H04L 67/125; H04W 4/40; H04W 4/44
  See application file for complete search history.

(56) References Cited

U.S. PATENT DOCUMENTS

| | | | |
|---|---|---|---|
| 2010/0171588 A1 | 7/2010 | Chutorash et al. | |
| 2011/0238794 A1* | 9/2011 | Wu | H04L 43/0811 709/220 |
| 2013/0321127 A1* | 12/2013 | Wilder | G05B 19/042 340/5.71 |
| 2015/0252607 A1* | 9/2015 | Hawkins | G05B 15/02 700/275 |
| 2016/0053526 A1* | 2/2016 | Dittrich | E05G 1/04 109/38 |
| 2017/0156076 A1* | 6/2017 | Eom | H04W 24/04 |
| 2019/0051071 A1* | 2/2019 | Lickfelt | E05F 15/73 |

OTHER PUBLICATIONS

International Preliminary Report of Patentability dated Feb. 11, 2020, for corresponding PCT application No. PCT/US2018/045746, 1 page.

Witten Opinion of the International Searching Authority dated Nov. 22, 2018, for corresponding PCT application No. PCT/US2018/045746, 5 pages.

\* cited by examiner

COMMUNICATION SYSTEM AND METHOD FOR A BARRIER OPERATOR

CROSS REFERENCE TO RELATED APPLICATIONS

This application claims priority to U.S. Provisional Patent Application No. 62/543,154, filed on Aug. 9, 2017, entitled "Communication System and Method for a Barrier Operator," which is incorporated herein by reference in its entirety.

TECHNICAL FIELD

The present application relates to a communication system and method for a barrier operator, and more particularly toward an adaptive communication system and method for obtaining information from the barrier operator.

BACKGROUND

Conventional barrier operators have been used in a variety of applications for controlling operation of a barrier, which may be any type of barrier or door, including a garage door or gate. The principle operation of the barrier operator is to operate the barrier to move from a first position to a second position, such as from a closed position to an open position or, conversely, from the open position to the closed position. The barrier operator may include a barrier driver, such as an actuator, chain drive, or belt drive, that actively moves the barrier from the first position to the second position. Additionally, or alternatively, the barrier driver may be configured to allow or assist movement of the barrier from the first position to the second position. Gravity, a spring element, a hydraulic element, or another mechanism, or a combination thereof, may facilitate movement of the barrier. For example, in the context of a garage door, the barrier operator may operate the garage door to move from an open position to a closed position with the assistance of gravity and a spring element. As another example, the barrier operator may be configured to release control over the barrier to allow a hydraulic hinge to facilitate controlled closure of the barrier from an open position to a closed position. This type of configuration can be seen in a conventional handicap accessible door.

Many conventional barrier operators include a communication interface that enables remote operation of the barrier operator via commands received from a device through the communication interface. For instance, the communication interface for a barrier operator of a garage door may include wireless capabilities that can be utilized by the device to wirelessly communicate a command to open or close the garage door. The device in this context is often a handheld device that an operator can secure to a vehicle. Alternatively, the device may be incorporated into the electrical system of the vehicle. One example of such an integrated system is the HomeLink® system, which is configured to wirelessly communicate with a variety of barrier operators to command operation of a barrier (including a garage door or front gate).

In some cases, the barrier operator is configured to communicate status information to the device via the communication interface. For instance, the barrier operator may inform the device that the barrier is opening, open, closing, closed, or stopped. This information may be communicated in the form of a status message from the barrier operator to the device. However, for a variety of reasons, including distance and/or interference, the device may not receive the status message from the barrier operator. As a result, the device may have outdated information with respect to the status of the barrier operator. The device in one conventional configuration waits an amount of time that is determined based on the slowest conceivable operation for a garage door to close. This amount of time is fixed in memory of the device so that the amount of time is used for all garage doors regardless of their type. If the device has not received the status message in the fixed timeframe, the device may immediately determine the operator for the garage door is out of range.

SUMMARY OF THE DESCRIPTION

The present disclosure is directed to a system and method for communicating with a barrier operator system to direct operation of a barrier. The system and method may include adaptively updating an expected time duration for an operational sequence that includes occurrence of an event relating to operation of the barrier operator system and receipt of a status message from the barrier operator system. The system may monitor and record the elapsed time for the operational sequence, and determine the expected time duration for the operational sequence based on the recorded history of elapsed times. If the status message is not received within the expected time duration after occurrence of the event, the system may transmit a status request message to the barrier operator system to obtain information relating to the status of the barrier operator system or the barrier, or both. This way, if the status message is missed (e.g., due to interference), the system can obtain an update on information relating to the status of the barrier system or the barrier, or both, that is likely close in time to when the status message was likely communicated from the barrier operator system.

In one embodiment, there is a method of communicating with a barrier operator system configured to direct operation of a barrier from a first position to a second position. The method may include storing an elapsed time threshold pertaining to an expected duration of time for the barrier to move to a second position, from a first position, after an event relating to communication of a command to move to the second position. The method may also include transmitting the command to the barrier operator system to move the barrier to the second position, and storing a start time pertaining to initial operation of the barrier operator system to move the barrier to the second position. Based on a determination that an amount of time elapsed since the start time is greater than or equal to the elapsed time threshold and a status message from the barrier operator system has not been received, a status request message may be transmitted to the barrier operator system to request communication of a status of the barrier. The method may further comprise receiving a status message from the barrier operator system indicative of the barrier arriving at second position; storing a stop time associated with a time of receipt of the status message indicative of the barrier arriving at the second position; comparing the start time to the stop time to yield an elapsed time for the barrier to move to the second position after the event relating to communication of the command; and adjusting the elapsed time threshold based on the elapsed time determined in the comparison of the start time and the stop time. The elapsed time threshold may be determined as an average of the elapsed time for multiple operations of the barrier operator system. The average may be a moving average such that the multiple operations is N number of prior operations initiated by transmission of the command to the barrier operator system. The method may further comprise receiving a status message from the barrier operator system indicative of the barrier initiating movement from the first position; and storing a time of arrival of the status message as the start time. The method may further comprise storing a time of transmission of the command as the start time. The barrier may be a garage door with the first position being a door open position and the second position being a door closed position. The expected duration of time may correspond to an estimated time of travel from the first position to the second position for a class of barriers inclusive of the barrier.

One embodiment of the present disclosure includes a vehicle system for communicating with a barrier operator system that is operably coupled to a barrier to move the barrier from a first position to a second position. The vehicle system may include power supply circuitry, a vehicle communication interface, a vehicle controller, and a human control interface. The power supply circuitry may be coupled to a power supply of the vehicle in order to receive power from the power supply of the vehicle. The vehicle communication interface may be configured to communicate wirelessly with the barrier operator, and the vehicle controller may be operably coupled to the power supply circuitry and the vehicle communication interface.

The vehicle controller may be configured to direct the vehicle communication interface to transmit a command to the barrier operator system to move the barrier to the second position. The vehicle controller may also be configured to store a start time pertaining to initial movement of the barrier from the first position, where based on a determination that an amount of time elapsed since the start time is greater than or equal to an elapsed time threshold, the vehicle controller may direct the vehicle communication interface to transmit a status request message to the barrier operator system to request communication of a status of the barrier.

The human control interface of the vehicle system may be operably coupled to the vehicle controller and capable of accepting input from a vehicle operator. The human control interface may also include a display capable of providing information to the vehicle operator that relates to the status of the barrier. In response to input from the vehicle operator, the vehicle controller may determine to transmit the command via the vehicle communication system. The elapsed time threshold may be determined as an average of the elapsed time for multiple operations of the barrier operator system. The average may be a moving average such that the multiple operations is N number of prior operations initiated by transmission of the command to the barrier operator system. The elapsed time threshold may correspond to an expected duration of time for the barrier to move from the first position to the second position after an event relating to transmission of the command. The elapsed time threshold may correspond to an estimated time of travel from the first position to the second position for a class of barriers inclusive of the barrier. The barrier may be a garage door with the first position corresponding to a door open position and the second position corresponding to a door closed position. In some embodiments, the vehicle communication interface may be configured to receive a status message from the barrier operator system indicative of the barrier arriving at the second position; the vehicle controller may store a stop time associated with a time of receipt of the status message; and the vehicle controller may adjust the elapsed time threshold based on a comparison of the start time and the stop time.

Another embodiment of the present disclosure includes a remote transmitter system, which may be incorporated into a vehicle. The remote transmitter system may include a wireless communication interface, memory and a processor. The wireless communication interface may enable communication with a barrier operator system, and the memory may be configured to store information pertaining to operation of the barrier operator system, such as an expected time lapse pertaining to a duration of time between occurrence of an event and receipt of a status message from the barrier operator system. The processor may be configured to direct the wireless communication interface to communicate with the barrier operator system to provide a command instruction relating to movement of the barrier from a first position to a second position, and may be configured to receive the status message from the barrier operator system. Based on the processor determining a time lapse between occurrence of the event equals or exceeds the expected time lapse and the status message has not been received, the processor may direct the wireless communication interface to transmit a status request message to the barrier operator system to request communication of a status of the barrier operator system. The event may be receipt of a message from the barrier operator system indicating the command instruction is being carried out to move the barrier from the first position to the second position, and the status message may indicate the barrier has reached the second position. The elapsed time threshold may be determined as an average of the elapsed time for multiple operations of the barrier operator system. The average may be a moving average such that the multiple operations is N number of prior operations initiated by transmission of the command to the barrier operator system. The processor may be configured to store in memory a start time associated with initial movement of the barrier from the first position, and the processor may monitor an amount of time elapsed since the start time to determine if the amount of time equals or exceeds the expected time lapse.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

Figure 1:
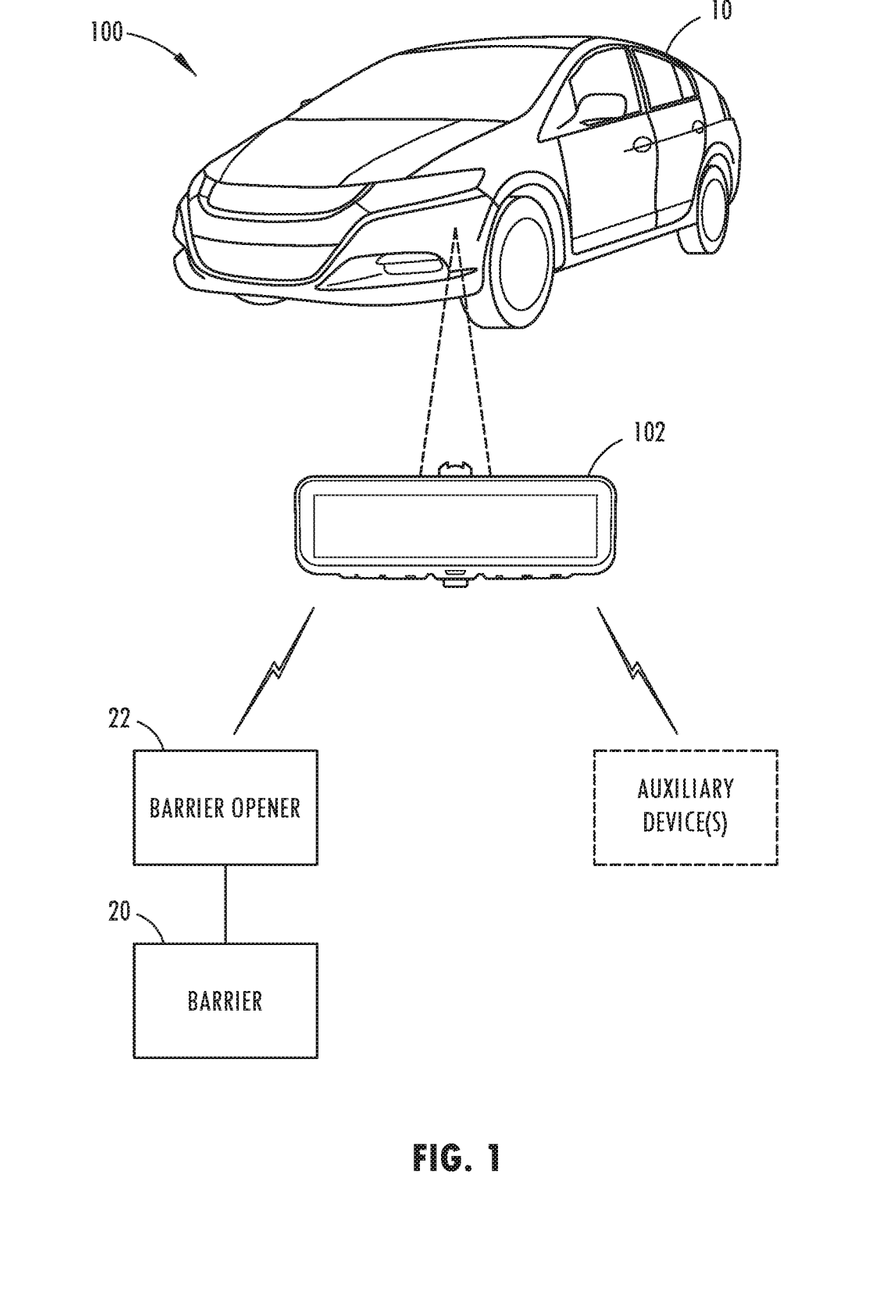
FIG. 1 shows a communication system for an operating barrier according to one embodiment incorporated into a vehicle.

A communication system for a vehicle is shown in FIG. 1 and generally designated 100. The communication system 100 may be incorporated into a vehicle 10, depicted in FIG. 1 as a passenger car but is not so limited. The vehicle 10 may be any type of vehicle adapted for transportation, including, for example, sport utility vehicles (SUV), buses, trucks, commercial vehicles, watercraft, and aircraft. The communication system 100 may communicate with a barrier operator system as described herein. It should further be understood that although the communication system 100 is described primarily in connection with a vehicle, the present disclosure is not limited to this configuration—the communication system 100 may be incorporated into another object or device other than a vehicle. As an example, the communication system 100 may be incorporated into a handheld device, such as a smart phone or a handheld garage door opener transmitter. One or more aspects of the communication system 100 may be incorporated into a rearview mirror system 102 of the vehicle 10.

Figure 2:
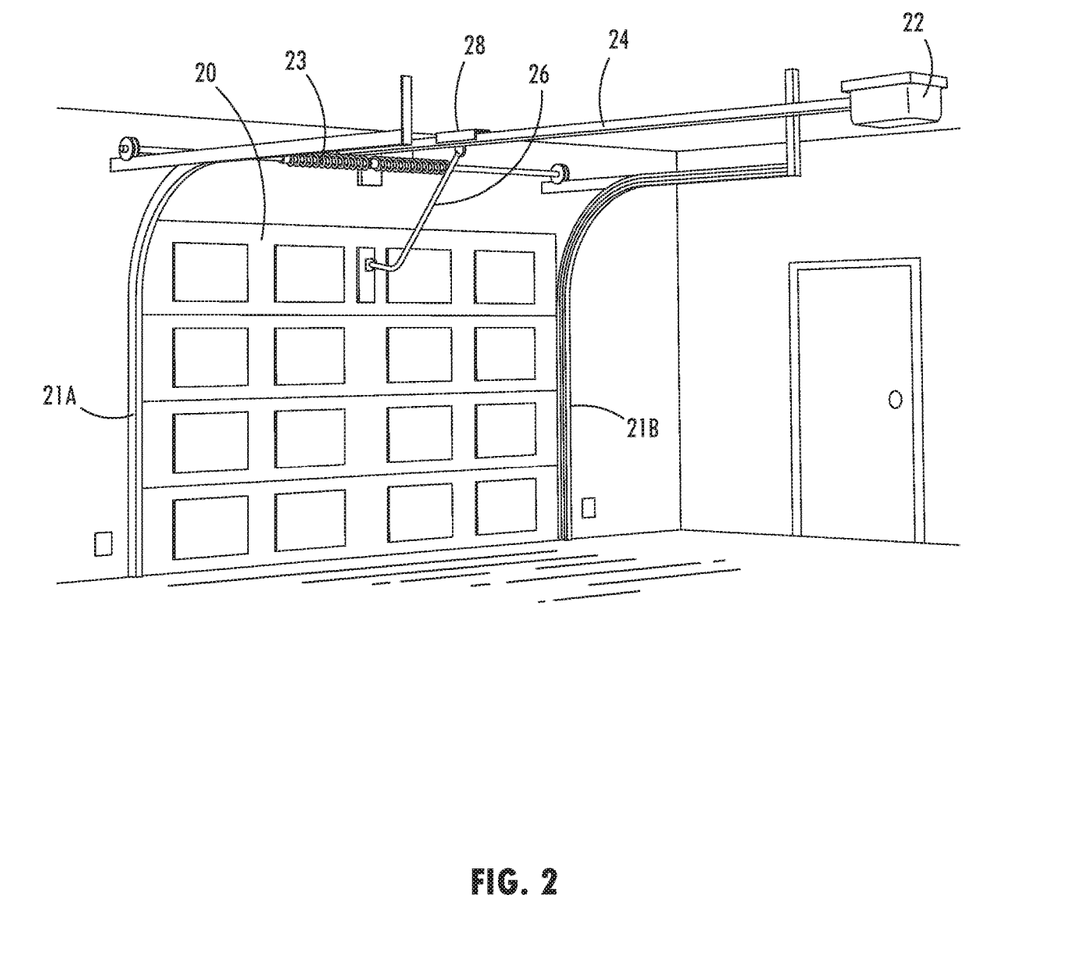
FIG. 2 shows a barrier system according to one embodiment.

The communication system 100 may be adapted to communicate with a barrier operator 22 shown for instance in FIGS. 1 and 2. For purposes of disclosure, the communication system 100 is described as communicating with a single barrier operator, but it should be understood that the embodiments herein may operate in conjunction with multiple barrier operators. For instance, the communication system 100 may be configured to communicate with two separate garage door operators, or a front gate controller and a garage door operator. Although the communication system 100 is described herein in conjunction with communicating with the barrier operator 22, the communication system 100 may communicate with other devices or auxiliary devices, such as building automation devices or other wirelessly accessible devices such as electronic toll collection systems and Bluetooth® capable smartphones, or any combination thereof.

The barrier operator 22 may be any type of operator, such as the MyQ garage door opener manufactured by Chamberlain Corporation, that is capable of operating the barrier 20 to move from a first position to a second position. As an example, the barrier operator 22 may be configured to move the barrier 20 from a closed position to an open position. The barrier operator 22 may be coupled to a barrier driver 24 configured to facilitate movement of the barrier 20. An example of this configuration can be seen in FIG. 2, which depicts a garage door operator system. The barrier 20 in the illustrated embodiment is a paneled garage door guided by door rails 21a-b, and the barrier operator 22 is a head unit mounted to the ceiling of the garage. The barrier driver 24 includes a releasable trolley 28 with an arm 26 coupled to the garage door. The releasable trolley 28 may be actuated by the barrier operator 22, via a chain or belt coupled to the releasable trolley 28, to effect movement of the garage door from a closed position to an open position along the door rails 21a-b. Conversely, the barrier operator 22 may control movement of the releasable trolley 28 to move the garage door from the open position to the closed position along the door rails 21a-b. A spring 23 coupled to the garage structure and the garage door may facilitate movement between the open and close positions.

The barrier operator 22 may include an operator communication system (not shown) capable of wirelessly communicating with a remote device. Wireless communication may be 2-way. For instance, the operator communication system may be capable of communicating according to a protocol utilized by the HomeLink® system. As another example, the communication system of the barrier operator 22 may be capable of communicating with a handheld remote transmitter with a rolling code based authorization protocol.

The communication system 100 may be trained or configured to store in memory a rolling code algorithm associated with the barrier operator 22. Storage of the rolling code algorithm may be conducted during an association phase with the barrier operator 22, where the communication system 100 is paired with the barrier operator 22. For instance, the HomeLink® system incorporated into the communication system 100 may utilize a rolling code based authorization protocol.

During the association phase, the barrier operator 22 and the communication system 100 may negotiate use of a hash function and identify an initial seed value for the hash. The hash function may be iteratively applied with the seed value being the first input to generate an output and each subsequent output being used as an input for the next output. This iterative application of the seed value in the hash function may be described as a hash chain. The output for a given iteration may be calculated in the communication system 100 and communicated from the communication system 100 to the barrier operator 22 as a rolling code indicative of authorization. There is a chance that a code in the hash chain is missed by the barrier operator 22, and so the barrier operator 22 may calculate several values of the hash chain to determine if the received code corresponds to an authorized code and to avoid a false negative with respect to the received code. It should be understood that the communication system 100 and barrier operator 22 are not limited to the rolling code technique or other communication and authentication techniques described herein, and that essentially any type of authentication process may be utilized to enable the barrier operator 22 to accept commands from the communication system 100.

Data bits may be communicated wirelessly in a variety of ways, depending on the application, including but not limited to phase shift keying, frequency shift keying or other frequency modulation techniques, amplitude shift keying or other amplitude modulation techniques, or pulse code modulation. The data bits communicated may include a rolling code and a command instruction to perform a particular task. As discussed herein, the rolling code may function to authenticate that the remote device is authorized to request the task associated with the command instruction. After the barrier operator 22 determines the command instruction is received from an authorized device, the barrier operator 22 may initiate steps to perform the command instruction.

In the illustrated embodiment, the communication system of the barrier operator 22 is capable of communicating information wirelessly to the communication system 100. The information may be encoded and/or encrypted depending on the application, and may relate to a status of the barrier operator 22 or the barrier 20, or both. Examples of status information provided by the barrier operator 22 include the following: barrier opening, barrier open, barrier closing, barrier closed, barrier stopped, and barrier obstruction. The barrier operator 22 may communicate this status information in response to a change in state of the status of the barrier 20. For instance, in response to the barrier 20 transitioning to a barrier closed state to a barrier opening state, the barrier operator 22 may communicate a barrier opening status message. Likewise, in response to transitioning from a barrier opening state to a barrier open state, the barrier operator 22 may communicate a barrier open status message.

Because the barrier operator 22 communicates status messages wirelessly to the communication system 100, there is a chance that the communication system 100 may miss or not receive one of the status messages. This can occur for various reasons, including interference or the communication system 100 being out of range with respect to the barrier operator 22, or a combination thereof. In one set of events, when the communication system 100 is incorporated into the vehicle 10, the vehicle operator may utilize a user interface to direct the communication system 100 to transmit an instruction to a garage door to close. The barrier operator 22 for the garage door may respond with a door closing status message, which may be received and displayed to the vehicle operator via a display interface. The vehicle operator may then direct the vehicle to drive away from the barrier operator 22. As the distance widens between the communication system 100 and the barrier operator 22, signal integrity of communications may diminish such that the door closed status message is not received by the communication system 100. The distance may therefore cause the communication system 100 to miss the door closed message. However, there is also a chance that interference and not distance may be the primary cause for a message being missed. Rather than waiting to receive the door closed message, the communication system 100 may query or request a status message from the barrier operator 22 to identify the state of the barrier 20. This way, effects due to temporary interference or another temporal reason for a missed message may be mitigated or substantially avoided by requesting transmission of a status message. If no message is received in response to the request (or one or more requests), the communication system 100 may reasonably assume that communications with the barrier operator 22 are unavailable for any number of reasons including those described above.

In one embodiment, the communication system 100 incorporated into a vehicle may be configured to receive status messages from the barrier operator 22. When the communication system 100 receives these messages, it may display corresponding barrier status information to the user via a display. There are instances, however, where the communication system 100 can miss a status message from the barrier operator 22, potentially resulting in the wrong status or no status at all being provided to the user. This can occur for various reasons, including signal interference, or because the communication system 100 is in a location where signal reception is weak.

Figure 3:
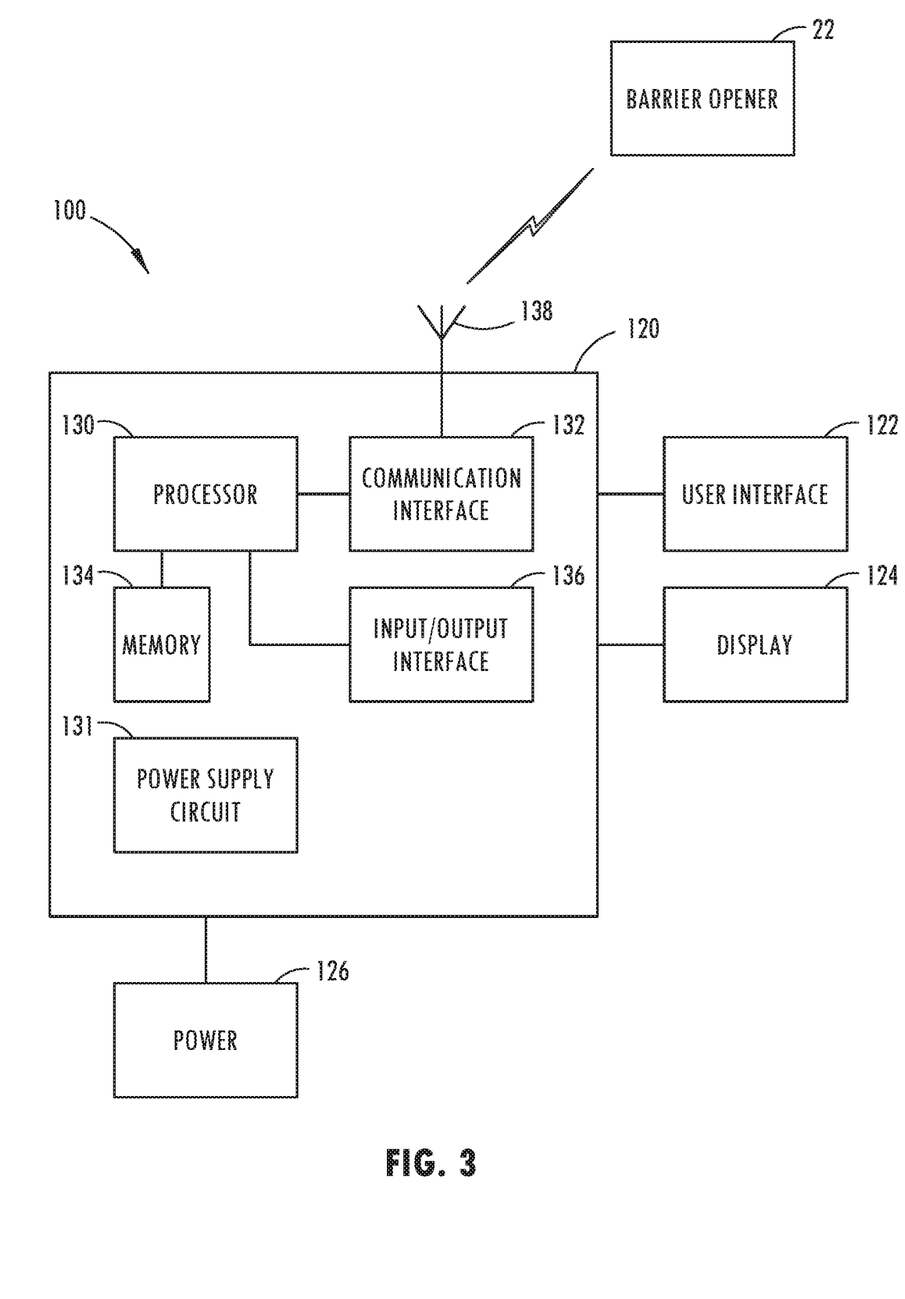
FIG. 3 shows a control system of the communication system of FIG. 1.

Turning to the illustrated embodiment of FIG. 3, a control system of the communication system 100 is shown and generally designated 120. The control system 120 may include a processor 130, memory 134, power supply circuitry 131, an input/output interface 136, and a communication interface 132. The power supply circuitry 131 may be coupled directly to a power source of another object, such as the vehicle 10. Alternatively, the power supply circuitry 131 may include a battery such that no external source of power is utilized for operation.

The input/output interface 136 may include one or more communication interfaces in addition to the communication interface 132, including wired and wireless interfaces. Examples of communication interfaces include discrete or analog inputs, discrete or analog outputs, I$^2$C or other serial and wired interfaces, Bluetooth® transceivers, Wi-Fi transceivers, ZigBee transceivers, Z-Wave transceivers and 6LoWPAN transceivers. The communication interface 132, as described herein, may be coupled to a communication antenna 138 and capable of communicating wirelessly according to a protocol compatible with the barrier operator, such as the HomeLink® system protocol. With the communication interface 132, the processor 130 may transmit and receive information or messages to and from the barrier operator 22. The processor 130 and memory 134 may be incorporated into a microcontroller, such as a Microchip PIC series microcontroller. It should be understood that the processor 130 and memory 134 may be separate devices depending on the application. The processor 130 may be configured to execute instructions retrieved from memory 134, including changing outputs and saving information in memory, permanently or temporarily, for use at a later stage in processing or conveying information to a user.

The processor 130 and memory 134 may be configured to utilize the communication interface 132 to communicate wirelessly with the barrier operator 22. In one embodiment, the processor 130 and memory 134 may be configured for a training phase or mode in which a frequency and bit code format used by a barrier operator 22 are determined. This information can be obtained from a transmitter associated with the barrier operator 22, such as by sniffing information transmitted from the transmitter to the barrier operator 22. The operational frequency band for communications with the barrier operator 22 may vary from application to application. As an example, the frequency band may be between 286 MHz and 440 MHz with bands therein that may be avoided. In another example, the frequency band may allow bidirectional communications at larger power levels, such as a frequency band higher than 440 MHz. In one embodiment, the frequency band for communication with the barrier operator 22 may be in the range of 902-928 MHz, such as in the case of communications with the Chamberlain MyQ.

In the illustrated embodiment, the input/output interface 136 may be operably coupled to the user interface 122 to receive input from a user such as a vehicle operator, and coupled to the display 124 to provide information to the user. The user interface 122 may include a plurality of discrete inputs each associated with a function or inputs with multiple function capabilities that enable a user to select or direct operation of the control system 120. The display 124 may enable the control system 120 to aid the user in operating the user interface 122, or displaying status information relating to the status messages received from the barrier operator 22. Additionally, or alternatively, the display 124 may provide video information, such as video information obtained from a rearview camera of a vehicle. The display 124 may be at least one of an LED and LCD display and may be incorporated into a rearview mirror 102 of the vehicle 10. In this configuration, one or more aspects of the display 124 may be selectively visible depending on whether they are activated. This type of operation may provide a type of dead front display with respect to information capable of being conveyed by the display. Alternatively, the display 124 may be separate from the rearview mirror 102.

An example configuration of the display 124 is depicted in the illustrated embodiments of FIGS. 4-7. In the illustrated embodiments, the display 124 is incorporated into the rearview mirror system 102. There are a variety of messages or indicators that the display 124 can provide to the user.

Figure 4:
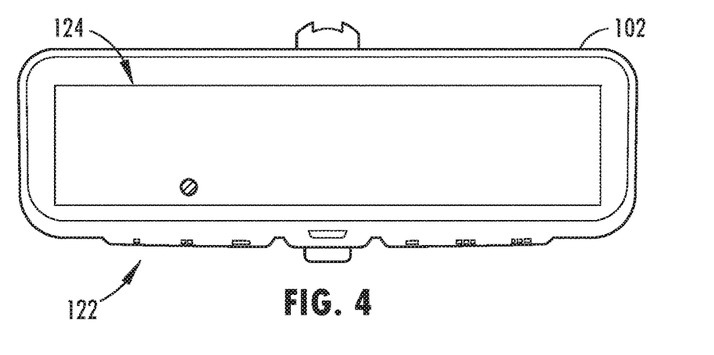
FIGS. 4-7 show a rearview mirror system in several operational modes in accordance with one embodiment.
Figure 5:
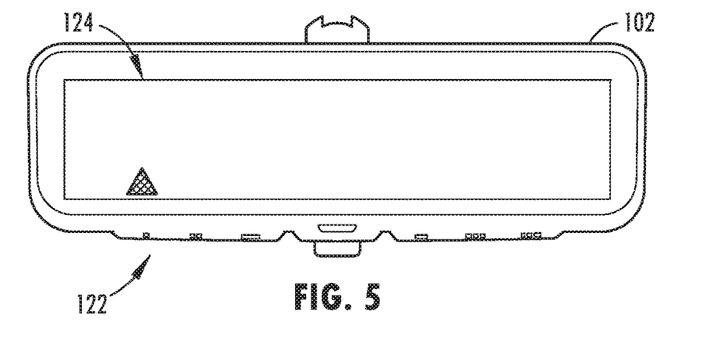

FIG. 4 depicts the display 124 activating a LED according to a rapid flashing pattern. The LED may be activated differently, such as solid or a different type of flashing pattern (e.g., long-short-long). The rapid flashing pattern may be activated in response to transmission of a message, initiated via the user interface 122, to the barrier operator 22. The message may be any type of message, including a request to open the barrier 20. The rapid flashing pattern may provide feedback to the user that the control system 120 is operational and taking steps to communicate with the barrier operator 22.

Turning to the illustrated embodiment of FIG. 4, the display 124 is shown activating an orange up arrow or triangle symbol to indicate that a message has been received from the barrier operator 22 that indicates a barrier opening status. The triangle symbol may slowly blink or flash to indicate the door opening status. The triangle symbol may be activated according to a pattern as described herein, depending on the application. If the message received from the barrier operator 22 indicates a barrier closing status, the activated triangle symbol may point down like a down arrow and blink in a manner similar to the up arrow to indicate the door closing status. As can be seen in comparing the illustrated embodiments of FIGS. 4 and 5, messages or indicators provided by the display 124 may not be visible to the user when inactive. The indicators may be disposed behind a dead front display to achieve this look and feel.

Figure 6:
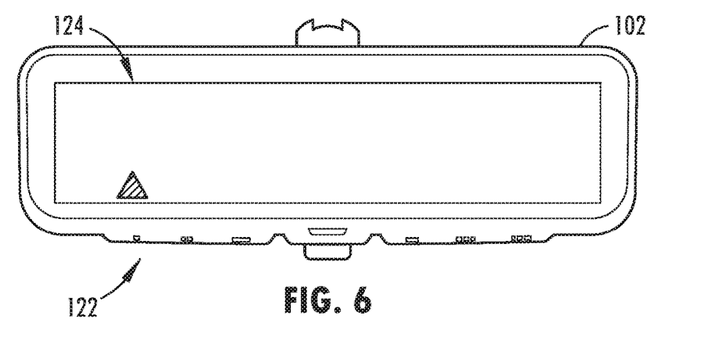
Figure 7:
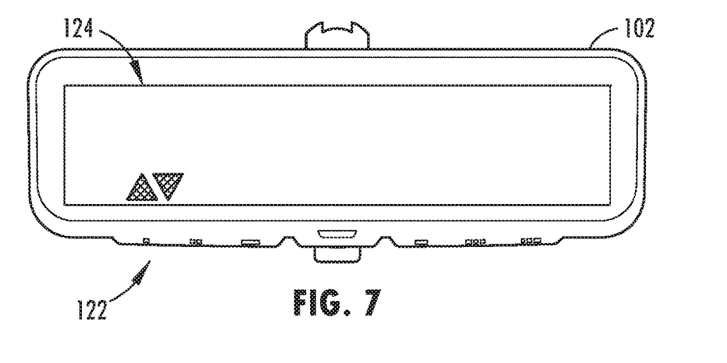

In the illustrated embodiment of FIG. 6, the control system 120 has received a barrier open message from the barrier operator 22, and activated a up arrow or triangle symbol to indicate the door open status to the user. Other symbols or shapes may be used to indicate door status, and the symbols may appear in different colors. For example, the up arrow indicating the barrier opening message may appear in green, the down arrow indicating the barrier closing message may appear in blue, and the up and down arrows used together to indicate out of range may appear in orange. In this case, the up arrow may be shown solid for a predetermined duration, generally considered brief, such as 3 seconds, before inactivating the up arrow. Conversely, receipt of a barrier closed message from the barrier operator 22 may result in activation of a down arrow in a manner similar to the up arrow. This way, the display 124 may convey to the user that the barrier operator 22 has indicated the barrier is open or the barrier is closed based on respective receipt of a barrier open message or a barrier closed message.

The messages outlined in the example above emphasize that the control system 120 may be configured to receive at least two types of messages from the barrier operator 22. One type of message can be identified as a final state message, such as a barrier closed status message and a barrier open status message, in which no further actions or messages are expected to follow without some instruction from the control system 120. Another type of message can be identified as an activity state message, such as a barrier closing or barrier opening message, after which a final state message is generally expected to be transmitted by the barrier operator 22. If the barrier opening message is received in the control system 120, but no barrier open message is ultimately received within a period of time or in response to an update query, the control system 120 may assume that communication capabilities with the barrier operator have been lost. In this case, the control system 120 may direct the display to display an indicator of lost communication, such as an out of range indication. In some embodiments, this may be manifested as both an up and a down arrow showing as shown in the illustrated embodiment of FIG. 7. The up and down arrows for an out-of-range indicator may display in a different color than the up or down arrows for the barrier status messages.

As discussed herein, there are occasions during which the control system 120 may lose communication capabilities with the barrier operator 22. For instance, interference or distance may affect the ability of the control system 120 to communicate with the barrier operator 22. In the illustrated embodiment, the control system 120 may not maintain an active, continuous communication channel with the barrier operator 22 to avoid significant wireless communication traffic. Instead, the control system 120 may wait for messages to be received from the barrier operator 22 to indicate status changes or status updates. With this communication protocol, if the control system 120 misses a status message expected to follow an event, there is a chance that the control system 120 may remain unaware of the change in state of the barrier 20. For instance, if the control system 120 receives a barrier opening status message but misses the barrier open status message, the control system 120 may assume that the barrier 20 is in the process of opening when in fact it has already reached an open position. In some cases, the control system 120 may utilize a timeout timer set at a predetermined time (e.g., 30 s) after receipt of an activity status message so that if no final status message is received after the predetermined time has elapsed, the control system 120 may request a status message from the barrier operator 22. If no response is received, the control system 120 may assume that communication capabilities have been lost and direct the display 124 to indicate accordingly, such as by providing the indication shown in the illustrated embodiment of FIG. 7. In other words, if the control system 120 times out or the predetermined time has elapsed before receipt of the final status message (e.g., door open, door closed), the control system 120 may display an "out of range" indication to the user via the display 124, and therefore the user may not receive confirmation that the barrier successfully reached the final state, such as being closed or open.

As another example, if the communication system 100 receives an interim status message or activity status message (e.g., door opening, or door closing), and waits up to a fixed, non-variable amount of time (e.g., 30 s) for a subsequent message (e.g., a door open, door closed, or door stopped message), there is a chance that the subsequent message would not be received and that the vehicle 10 may be too distant from the barrier operator 22 by the time the amount of time is expired in order to communicate effectively with the barrier operator 22. In this case, during the waiting period, the communication system 100 may continue to monitor for messages and display a barrier status corresponding to the interim status message. For instance, in response to the interim status message indicating door opening activity, the communication system 100 may direct the display 124 to indicate the door opening activity for the duration of the wait period. However, if the subsequent message is missed, and if the vehicle 10 signal integrity of communications with the barrier operator 22 is too weak by the time the communication system 100 ceases waiting to obtain a response to a status update request, the communication system 100 may transition to displaying an out of range status on the display 124.

One embodiment according to the present disclosure is configured to change and tailor the amount of time that the communication system 100 waits in order to coincide more closely in time with the likely transmission of the subsequent message or final message. This way the system may increase the probability of being within proximity to the barrier operator 22 and having sufficient signal integrity for communications. For instance, instead of waiting for a fixed period of time (e.g., 30 s) before sending a status update request, the control system 120 may monitor and store the average time from an event to receipt of a status message from the barrier operator 22, such as the time it takes to open a garage door or close the garage door. An additional example of operational sequences (or an event and transmission of a subsequent status message) that may be timed include the time between transmission of a command request from the control system 120 and receipt of an activity status message corresponding to the command.

To provide an example, the communication system 100 may determine that a door closed message is seen on average about 12 seconds after receiving the initial door closing message. If no updates have been received after this average time is exceeded, the control system 120 may send a status request message to the barrier operator 22. This may enable the control system 120 of the communication system 100 to obtain the status of the barrier 20 sooner than would otherwise occur with the ause of a fixed predetermined time, and increase the likelihood that the control system 120 is within range of the barrier operator 22 as the vehicle 10 (including the control system 120) travels away from the barrier operator 22. The expected message delay from occurrence of the event (e.g., receipt of a door opening message to receipt of a door closed message) may be monitored and updated by the control system 120, so that if for some reason the measured delay changes over time, the control system 120 may compensate and adjust the expected time accordingly.

As discussed herein, the control system 120 is not limited to measuring the elapsed time between an interim status message (e.g., door closing) and a final status message (e.g., door closed)—the control system 120 may measure elapsed time from occurrence of any type of event and receipt of a message from the barrier operator 22. This elapsed time may be associated with the type of event and stored in memory for analysis with respect to a future measured time for that type of event in accordance with one embodiment of the present disclosure. For instance, the control system 120 may store an elapsed time for a door closing event (e.g., measured from receipt of the interim status message to receipt of the final status message) and analyze this stored time in conjunction with an elapsed time measured in the future for a subsequent door closing event. It should be understood that elapsed time for any type of event, measured by occurrence of a start action and an end action for the event, may be analyzed by the control system 120.

In one embodiment, based on the measured elapsed time for prior event sequences, the control system 120 may determine a time to wait with respect to the message after occurrence of the event. If the determined time to wait is exceeded, the control system 120 may transmit a status update request to the barrier operator 22 to obtain information from the barrier operator 22.

For example, the control system 120 of the communication system 100 may monitor the time between transmission of a barrier activation command and receipt of an initial status message from the barrier 20. In a particular instance of this example, the user may press an input of the user interface 122 to open a garage door. The control system 120 may communicate a Request to Send (RTS) to the barrier operator 22, and in response, receives a Clear to Send (CTS) when the barrier operator 22 is ready for the command. The control system 22 may then send a command message corresponding to a door open command. The barrier operator 22 may respond with an Acknowledgement (ACK) message to indicate the command message was received. This negotiation may occur in a matter of milliseconds. The control system 120 at this stage would expect to receive an interim status message or activity status message, such as door opening, within 1-2 seconds. However, if this activity status message is missed, there is a chance the control system 120 may remain unaware of the status of the barrier operator 22 and barrier 20, and potentially time out with an out of range indication to the user. In one embodiment, if the activity status message is missed, the control system 120 may provide no indication of barrier activity to the user via the display 124, possibly resulting in user confusion about operation of the system and whether the command instruction was successfully received.

The control system 124 according to one embodiment may be configured to reduce the likelihood of such a time out by tracking the measured amount of time between receipt of the ACK message (corresponding to an event) and receipt of the activity status message (e.g., door opening message). As discussed herein, if the activity status message is not received within a predetermined amount of time based on prior operational sequences involving the ACK message event and receipt of the activity status message, the control system 120 may transmit a status request message to the barrier 20 to obtain updated information.

One embodiment according to the present disclosure involves constantly or intermittently communicating a status request message to the barrier operator 22. It should be understood, however, that continuous communications of this type may adversely affect communication performance (e.g., through collisions or other interference effects).

In the illustrated embodiment, the predetermined amount of time may be varied from one operational sequence (e.g., a first sequence with a request to close and a barrier closed condition) of the barrier operator 22 to a subsequent operational sequence (e.g., a second sequence with a request to close and a barrier closed condition) of the barrier operator 22. The predetermined amount of time may vary based on one or more measured parameters relating to operation of the barrier operator 22 or the barrier 20, or both. For instance, the control system 120 may measure the time lapse between receipt of barrier closing status message and receipt of the barrier closed status message. The time associated with receipt of the barrier closing status message may be stored in memory 134 as a start time, and the time associated with receipt of the barrier closed message may be stored in memory 134 as the stop time. In another example, the control system 120 may also measure the time lapse between receipt of the barrier opening status message and receipt of the barrier open status message, and store the respective times of receipt as start and stop times. The door opening time stored in memory may be based on the door closing time, or may be determined and stored separately from the door closing time. For instance, one type of barrier operator 22 may open the barrier 20 (e.g., a garage door) at a faster rate than it closes. This may enable the vehicle operator to drive the vehicle past the barrier 20 quicker when the barrier 20 is opening, while providing enhanced safety in closing the barrier 20 at a slower rate.

The one or more measured parameters may be processed with one or more statistical techniques to approximate the expected time lapse for a future occurrence of the operational sequence. For instance, the one or more measured parameters may be averaged to yield the expected time lapse. This may allow the communication system 100 to more reliably receive status updates from the barrier operator 22, making it less likely that the user will encounter "out of range" scenarios or situations where no door status is received.

Figure 8:
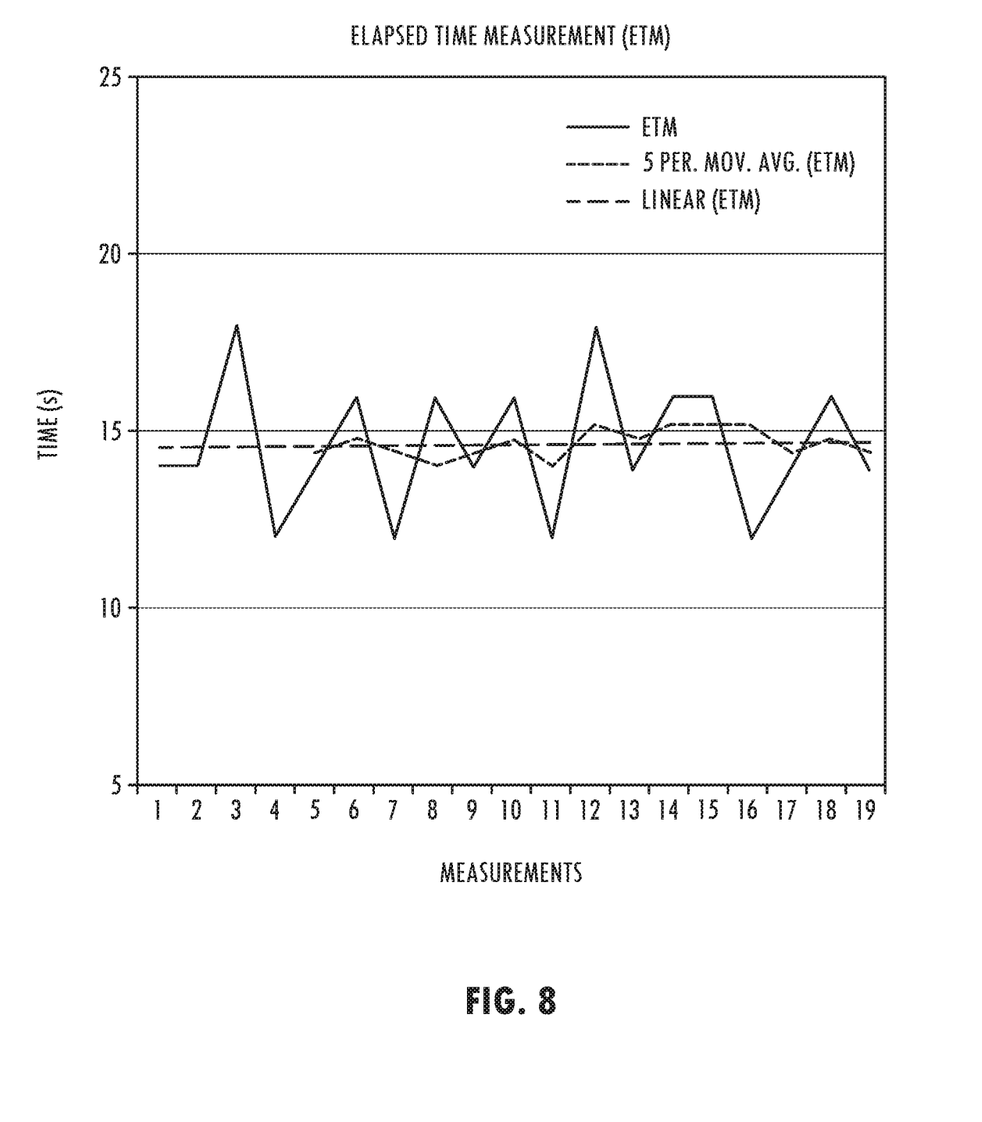
FIG. 8 shows a series of elapsed time measurements for an operational sequence of the barrier system.

The illustrated embodiment of FIG. 8 depicts a series of measurements of the time lapse between receipt of the door closing message and receipt of the barrier closed status message for multiple instances of an operational sequence involving the control system 120 requesting closure of the barrier 20 and the barrier operator 22 responding to the request by closing the barrier 20 as described herein. As can be seen, the elapsed time measurement may vary from one operational sequence to the next. For purposes of disclosure, FIG. 8 shows generally large changes in the elapsed time measurement over time. In practice, operation of the barrier 20 may be more consistent such that variations in the elapsed time measurement from one operational sequence to a subsequent operational sequence, possibly the next operational sequence, may be smaller. This way the standard deviation for a plurality of measurements relating to operation of a particular barrier may be much smaller than depicted in the illustrated embodiment of FIG. 8.

The control system 120 may determine the predetermined amount of time based on one or more of the elapsed time measurements for an operational sequence of the barrier 20. To provide an example, as shown in the illustrated embodiment of FIG. 8, the control system 120 may determine the predetermined amount of time based on a moving average (e.g., a 5 sample running average) of the elapsed time measurements. The moving average may be representative of the likely amount of time that would elapse for the operational sequence. If the control system 120 has not received a final state message, such as a door closed message, after a time corresponding to the moving average, the control system 120 may transmit a request for a status update to the barrier operator 22. By requesting such a status update closer temporally to the likely final state of the barrier 20, the control system 120 may significantly increase the probability of obtaining accurate, up to date status of the barrier 20.

For example, if the predetermined amount of time were fixed at 30 seconds, but the barrier 20 in actuality takes on average 15 seconds to close, there is an increased probability that a vehicle 10 with the control system 120 may drive away from the barrier 20 and be too far from the barrier 20 after 30 seconds to obtain an updated status request and the barrier closed status message is missed. By varying the predetermined amount of time to more closely approximate the amount of time the barrier 20 takes to complete an operational sequence, there is an increased probability of eliminating distance as an adverse condition that prevents obtaining an updated status message from the barrier operator 22 in response to a request for the same. If the barrier closed status message is missed, while the vehicle is being driven away from the barrier 20 and barrier operator 22, the control system 120 may reduce or avoid the adverse effects of distance on communication by requesting an updated status message closer temporally to the likely closure of the barrier 20.

In one embodiment, if the first status request sent does not return a "final" status and a second status message is sent some time later, if that second status message contains the final status being looked for, the overall time from the actuate to the final status may be used in the average calculation.

In one embodiment, the system is interested in the time from the initial status message to the final status message. If a second interim status message is received that is the same as the first, the system may continue measuring the time from the initial message. On the other hand, if a different interim status is received, then the system may abandon the first time measurement and begin tracking the time since the later interim message. An example of this is if the system were to get an initial "door closing" message, and then something interferes with the door and the system receives a "door opening" message. In this case, the system may abandon the initial measurement and begin a new time measurement from the "door opening" message.

It should be noted that there is a possibility that the amount of time lapse for the operational sequence may be greater than the moving average of prior measurements of the time lapse for the operational sequence. For instance, as depicted in the illustrated embodiment of FIG. 8, the moving average is less than the actual measurement for several samples. If the control system 120 requests a status update too early or before the barrier operator 22 completes the operational sequence, there is a chance that the control system 120 would need to transmit a second request for a status update after the operational sequence completed. To decrease the chances of this occurring, the control system 120 may incorporate a margin of error into the predetermined time. This approach may provide some additional time over the average amount of time lapse for the operational sequence in order to reduce the probability of early transmission of a status update request to the barrier operator 22.

The margin of error may be determined in a variety of ways depending on the application. In one embodiment, the margin of error may be fixed at a value (e.g., 2 s) selected at design time based on empirical evidence of barrier operation. In another embodiment, the margin of error may vary according to one or more statistical processes applied to the one or more measured parameters relating to operation of the barrier 20. For instance, the margin of error may correspond to one, two or more, or a fraction of standard deviations of the one or more previously measured parameters. As another example, the margin of error may correspond to a peak measurement of the one or more previously measured parameters.

Although described primarily in connection with varying a predetermined time lapse for a barrier close operation, it should be understood that the same or similar steps may be utilized in varying a predetermined time lapse for other operations, including a barrier open operation.

Figure 9:
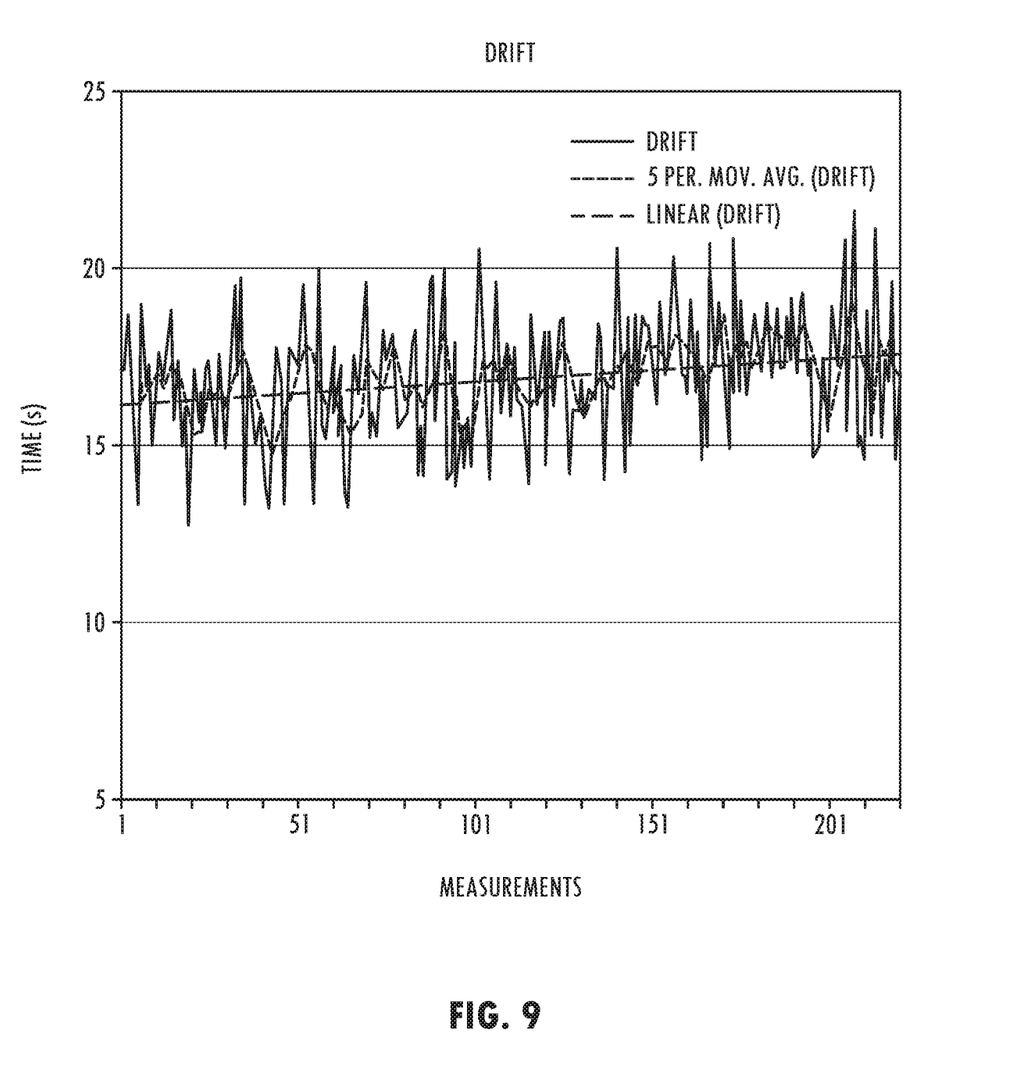
FIG. 9 shows another series of elapsed time measurements of the operational sequence of the barrier system.

Operation of the barrier 20 as discussed herein is not necessarily the same for all executions of an operational sequence. As discussed above, the elapsed time for the barrier 20 to open or close may vary due to one or more reasons but the average or moving average may remain generally stable. Additionally, or alternatively, the average or moving average may drift shorter or longer over time. For instance, the barrier 20 over time may close more slowly for a variety of reasons, such as lack of lubrication or wear and tear on the barrier operator 22. Conversely, applying lubrication to the barrier 20 may result in a general shortening of the time to close. By utilizing a moving average over an average of all past samples of the one or more measured parameters, the control system 120 may adapt to and account for such drift. An example of this phenomenon can be seen in the illustrated embodiment of FIG. 9 in which the moving average is trending upward.

Figure 10:
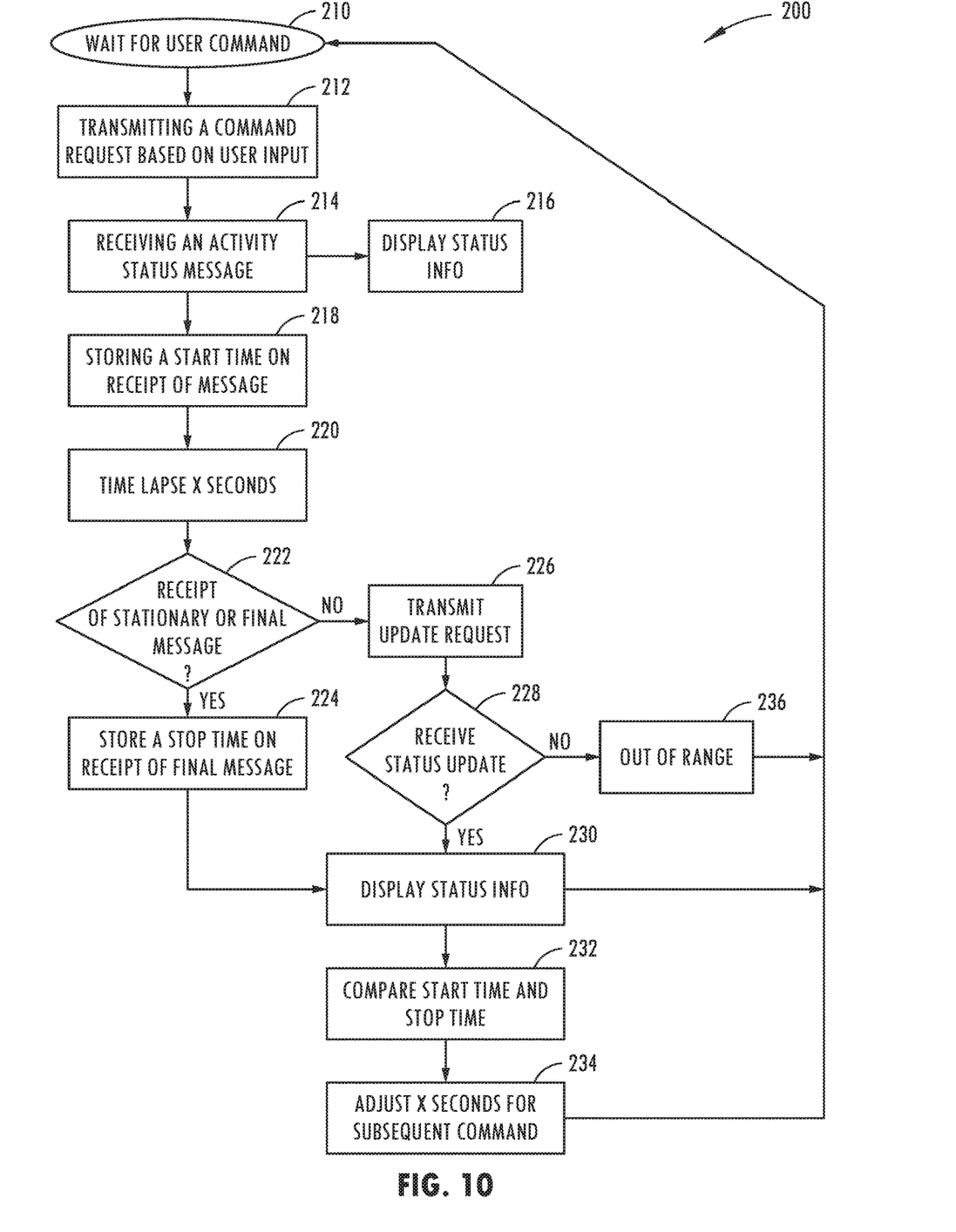
FIG. 10 provides a method according to one embodiment of the present disclosure.

A method of operation according to one embodiment is shown in the illustrated embodiment of FIG. 10, and generally designated 200. The method includes step 210, waiting for receipt of a command from the user via the user interface 122 or human control interface. After receipt of the command, such as a barrier open or barrier close command, in step 214, the control system 120 may transmit a corresponding instruction to the barrier operator 22 and indicate accordingly on the display 124, as in step 216. As discussed herein, the barrier operator 22 may communicate an activity status message to the control system 120 in response to receipt of the command instruction. An example of such a message is a barrier opening status message. The control system 120 may receive the activity status message and log the time of arrival of the message in memory 134 as a start time for the command operation in steps 214 and 218. The control system 120 may also indicate to the user via the display 124 that the barrier operator 22 is performing the requested command in step 216.

The control system 120 may determine as outlined herein a predetermined amount of time X to wait after receiving the activity status message from the barrier operator 22. This determination may be made based on one or more measured parameters relating to operation of the barrier 20 for the type of command provided to the barrier operator 22. For instance, in the case of a door open command, the determination of the predetermined time X may be based on prior measurements of the time it took the barrier operator 22 to open the barrier 20. As discussed herein, the determination may include a moving average calculation or other statistical analysis to yield the predetermined time X that is likely to correspond to the amount of time the barrier 20 and barrier operator 22 are expected to take in completing the commanded instruction. The control system 120 may then wait for the predetermined time X to receive a subsequent message or final status message from the barrier operator 22 indicating the commanded instruction has been completed. Step 220.

If the final status message is received within the window of time defined by the predetermined time X and the start time associated with receipt of the activity status message, the control system 120 may store the time of arrival of the final status message as a stop time as shown in steps 222 and 224.

If the control system 120 does not receive the final status message within this window of time, a status update request may be communicated from the control system 120 to the barrier operator 22. This way, even if the final status message was missed, the control system 120 may obtain status information from the barrier operator 22 near in time to when the final status message was likely transmitted. In other words, if no final status message is received after or equal to a threshold amount of time corresponding to the predetermined time X, the control system 120 may transmit a status information request to the barrier operator to request a status message about the state of the barrier 20 as in steps 222, 226. The control system 120 may expect to receive a near immediate response to the status information request, so if no response is received, the control system 120 may determine that the barrier operator 22 is out of range and direct the display 124 to indicate this out of range condition. After this condition is identified via the display, the control system 120 may return to wait for another user command in step 210. However, if the response is received, the control system 120 may indicate the final status of the barrier 20 (e.g., barrier open) to the user via the display 124 and then proceed to wait for another user command as in steps 230 and 210.

In the illustrated embodiment of FIG. 10, if the control system 120 receives a final status message within the window of time defined by the predetermined time X, and the time of arrival of the message is stored in memory 134, the control system 120 may indicate the final status of the barrier 20 to the user via the display 124 in step 230. The control system 120 may also compare the start time and the stop time, such as by calculating a difference between these times to yield an elapsed time for the command operation. This measurement of the elapsed time may be stored in memory 134 and used as a basis for calculating the predetermined time X for a subsequent operational sequence for the command instruction in steps 232 and 234. The control system 120 may wait for another command instruction in step 210.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

What is claimed is:

1. A method of communicating with a barrier operator system, the barrier operator system configured to direct operation of a barrier from a first position to a second position, the method comprising:

determining an average elapsed time threshold pertaining to an expected duration of time for the barrier to move to the second position from the first position after an event relating to communication of a command to move to the second position, the average elapsed time threshold comprising an average of elapsed times for multiple operations of the barrier operator system;

storing in a communication system the average elapsed time threshold;

transmitting the command to the barrier operator system to move the barrier to the second position;

receiving an activity status message indicating the status of the barrier when the barrier is moving from the first position to the second position;

storing in the communication system a start time pertaining to initial operation of the barrier operator system to move the barrier to the second position;

determining whether an amount of time that has elapsed since the start time is greater than or equal to the average elapsed time threshold;

determining whether a final status message on the status of the barrier has been received from the barrier operator system;

transmitting, based on both the determination that the amount of time elapsed since the start time is greater than or equal to the average elapsed time threshold and the determination that the final status message has not been received from the barrier operator system, a status request message to the barrier operator system to request communication of a status of the barrier; and causing, upon a determination that the final status message has not been received in response to the status request and a determination that a predetermined amount of time has passed, an indicator of lost communication to be displayed;

wherein determining the average elapsed time threshold comprises:

determining an elapsed time by:

receiving the final status message from the barrier operator system indicative of the barrier arriving at second position;

storing a stop time associated with a time of receipt of the final status message indicative of the barrier arriving at the second position;

comparing the start time to the stop time to yield the elapsed time for the barrier to move to the second position after the event relating to communication of the command; and adjusting the average elapsed time threshold based on the elapsed time determined in the comparison of the start time and the stop time.

2. The method of claim 1, further comprising storing a time of transmission of the command as the start time.

3. The method of claim 1, wherein the barrier is a garage door with the first position being a door open position and the second position being a door closed position.

4. The method of claim 1, wherein the average elapsed time threshold is a running average elapsed time threshold; and further comprising adjusting the average elapsed time threshold by averaging the elapsed time threshold based on the elapsed time determined in the comparison of the start time and the stop time with a predetermined number of elapsed time thresholds.

* * * * *